United States Patent [19]

Christiansen et al.

[11] Patent Number: 4,480,171

[45] Date of Patent: Oct. 30, 1984

[54] GAS TUNGSTEN ARC WELDER WITH ELECTRODE GRINDER

[75] Inventors: David W. Christiansen, Kennewick; William F. Brown, West Richland, both of Wash.

[73] Assignee: The United States of America as represented by the United States Department of Energy, Washington, D.C.

[21] Appl. No.: 445,604

[22] Filed: Nov. 30, 1982

[51] Int. Cl.³ .............................................. B23K 9/00
[52] U.S. Cl. ................... 219/136; 219/60 A; 219/75
[58] Field of Search ............... 219/136, 137 R, 60 A, 219/60 R, 75

[56] References Cited

U.S. PATENT DOCUMENTS

| | | | |
|---|---|---|---|
| 3,828,518 | 8/1974 | Silk et al. | 53/12 |
| 4,063,962 | 12/1977 | Arya et al. | 134/8 |
| 4,075,454 | 2/1978 | Duncan et al. | 219/137 R |
| 4,174,938 | 11/1979 | Cellier | 425/317 |
| 4,188,521 | 2/1980 | Yeo | 219/60 A |

Primary Examiner—C. L. Albritton
Assistant Examiner—Alfred S. Keve
Attorney, Agent, or Firm—Robert Southworth, III; Richard E. Constant; Michael F. Esposito

[57] ABSTRACT

A welder for automated closure of fuel pins by a gas tungsten arc process in which a rotating length of cladding is positioned adjacent a welding electrode in a sealed enclosure. An independently movable axial grinder is provided in the enclosure for refurbishing the used electrode between welds.

7 Claims, 8 Drawing Figures

1

GAS TUNGSTEN ARC WELDER WITH ELECTRODE GRINDER

The United States government has rights in this invention pursuant to Contract DE-AC14-76FF02170 between the U.S. Department of Energy and Westinghouse Electric Corporation.

BACKGROUND OF THE INVENTION

The present invention relates generally to automated loading of fuel assemblies for nuclear reactors. It comprises an apparatus for automatically welding end caps to cladding after the fuel pins have been filled and cleaned.

This disclosure relates to the assembly of nuclear fuel assemblies, particularly for use in fast breeder reactors. The present state of the art involves fabrication of fuel assemblies by manual manipulation or by mechanical processes incapable of limiting spread of radioactive contamination to adjoining components and equipment. In such configurations, the fabrication steps are time consuming and create significant radiation contamination control problems.

To achieve flexibility of process steps, radiation contamination control, and efficient fabrication in an apparatus having production capability, the present invention has been directed toward development of a self-contained automated loading system. It allows for system variation and contamination control without degrading production capability. More specifically, the present apparatus permits fabrication and final welding of fuel assemblies by batch processing methods, using equipment which can be physically and environmentally isolated as required.

A large scale system for manufacturing nuclear fuel pellets is disclosed in U.S. Pat. No. 4,174,938. The system includes process components arranged vertically and providing for gravity flow of the product from one component to the next. The various process components are modular and each can be removed without interfering with the others. Physical isolation of the components is provided by appropriate seals and manual access is accomplished through glove ports. Another large scale system for cleaning nuclear fuel elements is shown in U.S. Pat. No. 4,063,962. Batches of fuel elements are suspended vertically and moved through the components of the system. Airlocks and seals are provided to contain contamination.

U.S. Pat. No. 3,828,518 discloses a welding apparatus for closing the end of a fuel rod by use of a rotating electrode head.

SUMMARY OF THE INVENTION

It is an object of this invention to effectively merge gas tungsten arc welding techniques with a batch system for automatically filling and inerting fuel pins.

Another object of this invention is to provide a system in which the various work stations and subsystems are modular. They can be duplicated when required by production quotas, and individual components can be removed or substituted as necessitated by servicing and repair schedules.

Another object of the invention is to provide an integrated system for fabricating fuel pins which can be totally automated.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purposes of the present invention as embodied and broadly described herein, the apparatus of this invention may comprise a welding apparatus located within a sealed chamber. The open end of the cladding of loaded fuel pin is positionable adjacent an arc welding tip and an end cap is brought into place for welding purposes. The cylindrical surfaces of the cladding are rotated to complete the required circumferential weld. The movable electrode is also positionable against a tip grinder which can reshape the tip after each welding sequence.

BRIEF DESCRIPTION OF THE DRAWINGS

The accompanying drawings, which are incorporated into and form a part of the specification, illustrate several embodiments of the present invention and, together with the description, serve to explain the principles of the invention. In the drawings:

FIG. 5 is an enlarged simplified view illustrating welding of an end cap;

DETAILED DESCRIPTION OF THE INVENTION

This invention is directed to an automated fuel pin loading system for nuclear reactors. It is directed specifically toward automated fuel pin production with maximized protection against spread of contamination.

Figure 1:
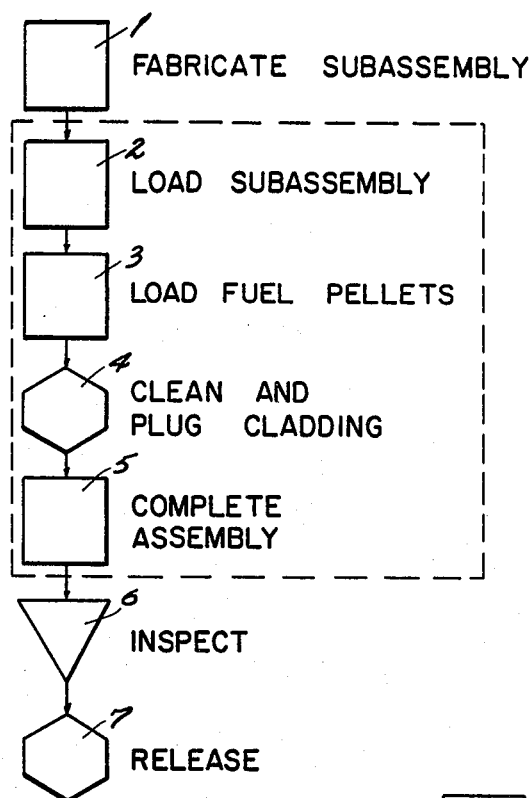
FIG. 1 is a simplified flow diagram of the system.

FIG. 1 shows the general flow path for fuel pin fabrication. The boxes bounded by dashed lines represent components of the potentially contaminated automated fuel pin loading system which is the subject of this disclosure.

Figure 2:
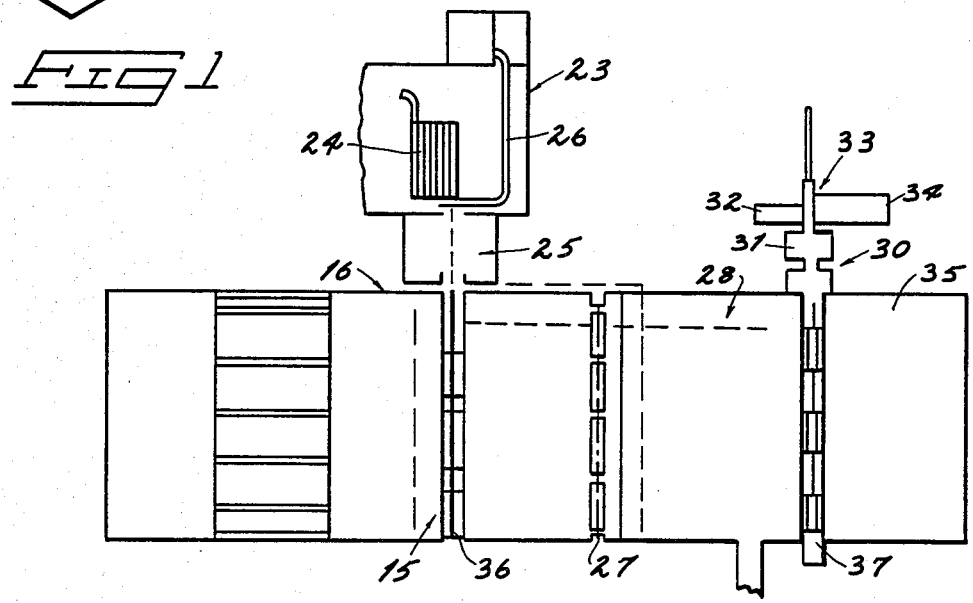
FIG. 2 is a simplified plan view of the apparatus.

Referring to the flow path shown in FIG. 1 and the associated schematic plan view shown in FIG. 2, the general steps of the process carried out by this system can be outlined. The uppermost box 1 in FIG. 1 indicates the step of fabricating the fuel pin subassembly, which is accomplished outside the scope of the present system. Box 2 of the flow diagram represents the loading or feeding of the fabricating fuel pin subassemblies into the system. This is accomplished by a cladding loader 15 comprising a suitable gravitational hopper for individually directing the lengths of fuel cladding 10 into a gravity feed conveyor shown generally at 16. The gravity feed conveyor directs parallel lengths of fuel cladding 10 from one station to the next in this system.

The individual lengths of fuel cladding 10 are next loaded with fuel pellets as required by the reactor for which they are designed. This general step is represented by box 3 in the flow diagram. It is accomplished at a pellet loading station 23. The pellet loading station 23 is environmentally isolated from the remainder of the equipment in order to prevent radioactive contamination of the conveying and handling elements which necessarily contact the fuel cladding 10. To assure against contamination, the filled lengths of fuel cladding 10 are cleaned and temporarily plugged, steps represented by box 4 in the flow diagram. These steps are carried out in a cleaning and capping unit 25 at the entrance/exit of the pellet loading station 23.

Final assembly of the fuel pin is represented by box 5, and is accomplished in an inerting enclosure 28 and welding station 30. The gas within the fuel cladding 10 is displaced by a desired inert atmosphere, the interior components of the fuel pin assembly are loaded adjacent to its open end, and the open end is sealed by a welded cap.

The boxes 6 and 7 in the flow diagram represent inspection and release steps carried out in addition to the steps of this system prior to actual usage of the fuel pins.

To complete the discussion of FIG. 2, it further represents a pellet loading tray 24 included within the pellet loading station 23. The loading tray 24 arranges individual pellets in elongated rows for insertion within individual lengths of fuel cladding. Also provided within the pellet loading station 23 is a funnel handling unit 26 which receives funnels after removal from each length of fuel cladding 10. It maintains the funnels in a guarded environment for subsequent disposal.

Interspersed along the length of the gravity feed conveyor 16 are two cladding transports 36 and 37 aligned alongside the pellet loading station 23 and the welding station 30, respectively. Transports 36 and 37 basically position individual lengths of fuel cladding 10 for axial movement relative to the gravity feed conveyor 16. They also have the capability of imparting rotational movement to the fuel cladding 10 for rotation about their individual longitudinal axes. Axial and rotational movement of the cladding is coordinated with the functions of the equipment operating at the open end of the length of fuel cladding 10 during the steps carried out within this system.

An accumulator 27 is arranged between transport 36 and the inerting enclosure 28. The accumulator gathers a relatively large number of loaded lengths of fuel cladding, which are then fed as a batch into the inerting enclosure 28.

Figure 3:
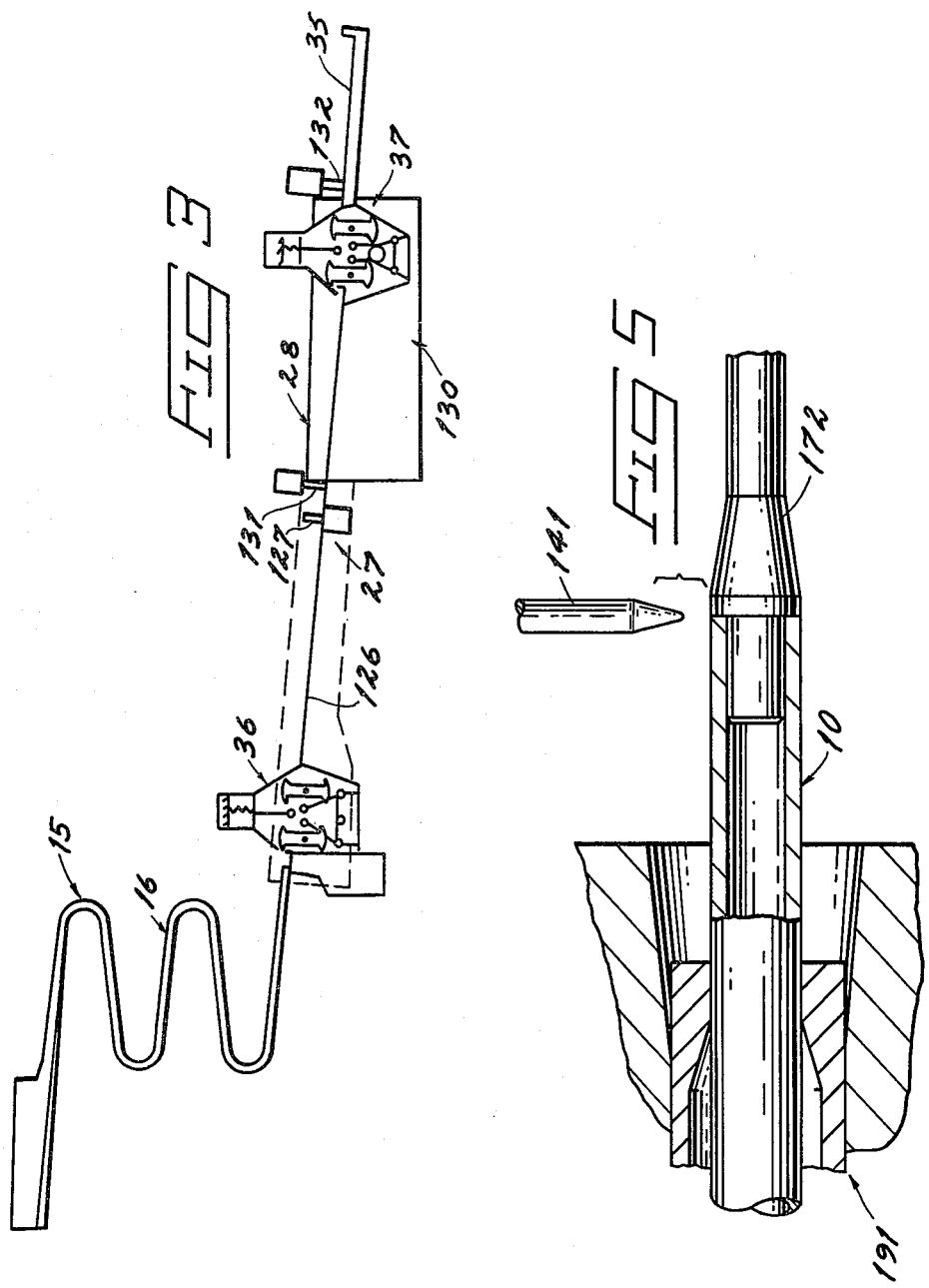
FIG. 3 is a schematic elevational view of the apparatus.

After the pellet loading process and cladding cleaning steps have been accomplished by the equipment generally shown in FIG. 2, the fuel pin subassemblies are individually removed from transport 36 and are permitted to roll along the receiving guide supports 126 of gravity feed conveyor 16 to a solenoid operated transverse stop 127 (FIG. 3). Stop 127 acts as an accumulator to gather the requisite number of fuel pin subassemblies for an inerting sequence.

Inerting of the fuel pin subassemblies is accomplished in a batch sequence. It is performed within a rectangular pressure vessel schematically shown at 130. The inlet to the vessel 130 includes a solenoid actuated sealable door 131. A similar door 132 is provided at its outlet. The gravity feed conveyor, which extends through the vessel 130, maintains a minimum nuclear cross section from a criticality viewpoint. However, other arrangements of the inerting vessel are capable of being substituted in the system, such as a barrel arrangement set to one side of the principal conveyor path.

After the predetermined charge of fuel pin subassemblies is contained within the pressure boundaries of vessel 130, the vessel and its contents can be evacuated and backfilled with the desired inerting gas. In a typical operational system, several hundred fuel pins might be inerted in a single batch, and the process might require several hours. Multiple vessels 130 can be interchanged within the system, depending upon production speed requirements. It should be noted that during the evacuation process, contamination by gas removal from the fuel pin subassemblies is prevented by removable filter plugs 115.

The welding station 30, as shown schematically in FIG. 2, includes a welder 31, an end hardware loader 34, and an end cap feeder 32. Various components which must be directed into or onto the open end of each length of fuel cladding prior to welding of an end cap are moved into place by a barrel loader, generally shown at 33.

To complete the system, fuel pin storage facilities 35 are provided downstream from transport 37. They are arranged to receive the completed fuel pins from the system, holding them for subsequent inspection and eventual release.

Figure 6:
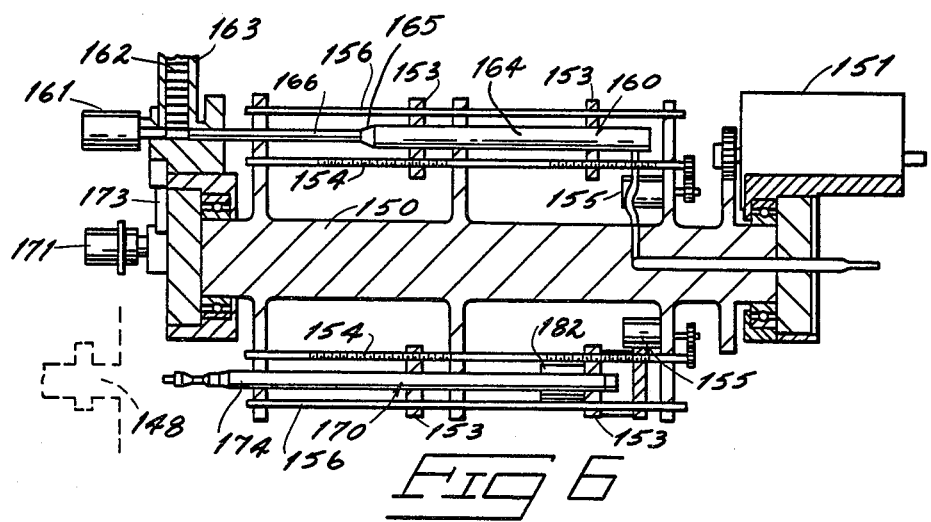
FIG. 6 is an axial sectional view of a barrel loader.
Figure 7:
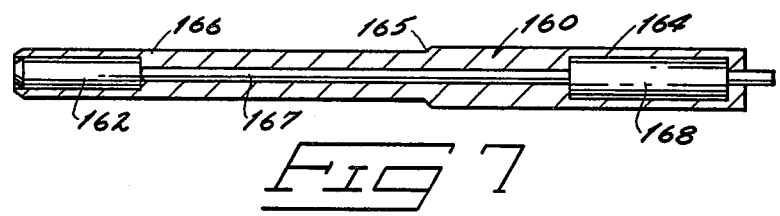
FIG. 7 is an enlarged axial sectional view of an apparatus for inserting a reflector or other component into a fuel pin.
Figure 8:
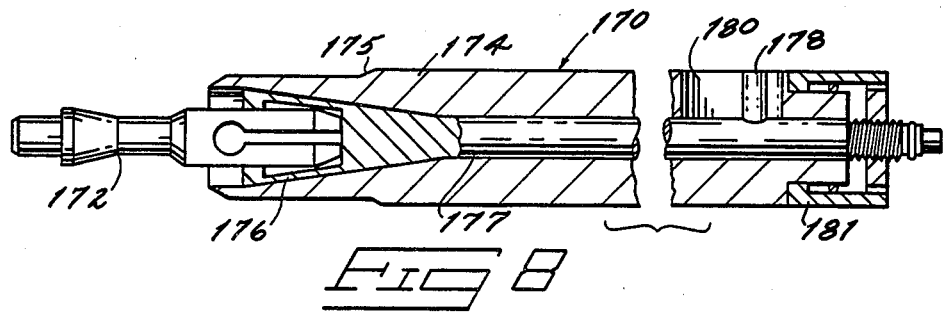
FIG. 8 is an enlarged fragmentary sectional view of an apparatus for inserting an end cap.

The following disclosure is specifically directed to the details of welder 31 (FIGS. 4,5) and the barrel loader (FIG. 6) and subassemblies located on it (FIGS. 7,8).

Following the inerting procedures, each fuel pin subassembly is directed to transport 37, which supports the cladding 10 for axial transverse movement relative to the gravity feed conveyor and for rotational movement about the cladding axis. While the cladding is positioned by transport 37, the filter plug 115 is removed, the reflector assemblies (if any) are inserted within the cladding, and an end cap is welded at the open end of the cladding to complete the fuel pin assembly.

Figure 4:
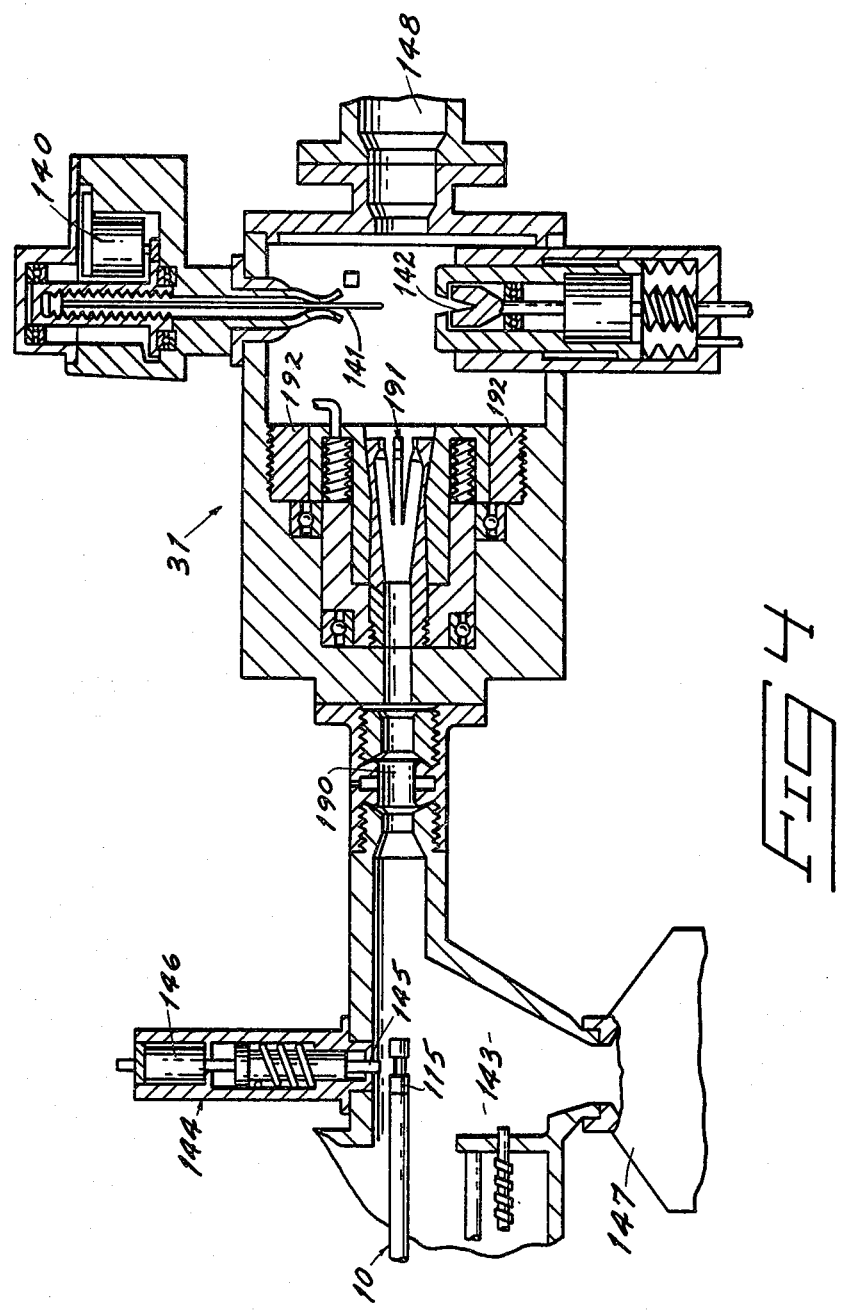
FIG. 4 is an axial sectional view through a gas tungsten arc welder adapted for use in the system.

FIG. 4 shows details of the welder 31. It makes use of a gas tungsten arc (GTA) welding system. The general details of welder 31 are conventional. It should be noted that prior efforts to automate applications of a GTA welder for fuel pin usage have been limited due to electrode tip maintenance, which is sometimes required after welding of each individual fuel pin. This problem is overcome in the present system by providing an electrode drive mechanism 140 that can selectively move the tip of electrode 141 radially inward toward the operational axis of the welder 31. A rotatable grinder 142 is also selectively movable in a radial direction along an axis coaxial with the electrode 141. Grinder 142 is shaped to grind the electrode tip to the desired tip configuration as grinder 142 reaches a preselected stop position. Grinder 142 is operated to refurbish the electrode 141 after each fuel pin welding sequence, thereby eliminating the need for manual adjustment or checking of the electrode tip condition.

As shown in FIG. 4, the incoming cladding 10 is directed by the supporting transport 37 to a sealed chamber 143 in communication with the inerting vessel 130. The transport 37 first positions the filter plug 115 directly beneath a retractable end plug remover 144. The end plug remover 144 includes a downwardly open C-clamp 145 which is complementary to an annular groove formed about the exterior of the filter plug 115. A solenoid or air cylinder 146 is selectively operable to position C-clamp 145 about the plug 115 with the surfaces of the C-clamp 145 engaging the shoulders of the plug groove. Transport 37 can then be operated to retract cladding 10, which allows plug 115 to fall into a capture tube 147.

After removal of filter plug 115 has been completed, transport 37 is operated to axially shift the open end of cladding 10 into the interior enclosure of welder 31. Cladding 10 is radially positioned and gripped by a bellows-operated collet 191 rotatably journalled within the welder 31 by bearings shown at 192. Thus, as cladding 10 is rotated by operation of transport 37, the collet 191 clamped to it will be freely rotated about its coaxial axis on the welder while providing axial and longitudinal support adjacent to the open end of cladding 10. After welding, the collet 191 is freed and seal 190 is released. The fuel pin can then be retracted through chamber 143 by operation of the transport 37.

The cylindrical surfaces of cladding 10 can be sealed by an inflatable seal 190. The seal 190 includes a yieldable membrane which can be pressurized by air directed about a surrounding groove. Seal 190 is not required during operation of the GTA welder, but is utilized to seal off the interior of the welder 31 and barrel loader 33 from enclosure 28 during inerting operations. This can be accomplished by feeding a dummy pin into the welder and operating seal 190 to thereby close off the entrance into the inerting enclosure 28. By providing each batch of fuel pin assemblies with a final dummy pin for this purpose, the necessity of carrying out the inerting steps throughout the greater volume of the welder and loading equipment is prevented. After inerting has been accomplished, seal 190 can be relaxed. The atmospheres within the welder and loading equipment will be maintained as an inert atmosphere at all times.

With the open end of cladding 10 located within the chamber 143, various barrel loaders can be directed through the welder 31 and into chamber 143 for placement of reflectors, tag gas capsules and other internal or external elements required to complete assembly of the fuel pin.

General details of a barrel loader for inserting reflectors and end caps are shown in FIG. 6. A rotatable barrel frame 150 is shown supporting a reflector loader 160 and a diametrically opposite end cap loader 170. The details of loaders 160 and 170 are shown respectively in FIGS. 7 and 8.

The barrel frame 150 is rotatably supported about an axis parallel to the axes of the loaders 160 and 170. It can be indexed about its axis to coaxially align alternate loaders 160 and 170 along the axis of welder inlet 148. The loader 160 is alternately aligned coaxially with a reflector injector 161 which receives reflectors 162 from a reflector hopper 163. Similarly, the end cap loader 170 can be indexed about the axis of the barrel frame 150 to align it coaxially with an end cap injector 171 which receives end caps 172 from a hopper 173 located to the rear of the view shown in FIG. 6.

The reflector loader 160 comprises a tubular guide 164 having a shoulder 165 complementary in size and shape to the interior of the welder inlet 148 as shown in FIG. 7. A coaxial extension 166 protrudes from guide 164 and is insertable within the cladding 10. It includes an outer cavity which frictionally holds a reflector 162 for insertion purposes. A reciprocable plunger 167 is powered by a double acting pneumatic cylinder 168 operatively connected to a source of air mounted on the barrel frame 150.

The details of the end cap loader 170 are shown in FIG. 8. It also includes a guide 174 having a shoulder 175 that fits within the welder inlet 148. No extension is provided on guide 174, since the end cap 172 is inserted directly at the open end of cladding 10 prior to welding. The end caps 172 are individually held by a collet including gripping spring fingers 176 at the end of a shaft 177 which is reciprocable within guide 174. Relative rotation between shaft 177 and guide 174 is prevented by interengagement between a radial pin 178 on the shaft 177 and a receiving longitudinal slot 180 formed through the guide 174.

The guide 174 acts as a locking sleeve to urge the collet fingers 176 radially inward against the surfaces of end cap 172. This is accomplished by an abutting collar 181 threadably engaged about the outer end of shaft 177. Collar 181 is selectively rotatable by operation of a drive motor 182 (FIG. 6) operably connected to the collar 181. It can be operated to grip and lock an end cap 172, or to alternately release the end cap after the welding step has been completed.

Both loaders 160 and 170 are mounted on the barrel frame 150 for free rotation about their individual axes, as well as for reciprocating movement parallel to their respective axes. The guides 164 and 174 include integral supporting bearings 153 which surround them and receive threaded lead screws 154 powered by longitudinal drive motors 155 operably connected to them by suitable drive gears. The bearings 153 also receive stationary guide rods 156 which stabilize their longitudinal movement as imparted by rotation of the respective lead screws 154. Each of the loaders 160 and 170 are movable between a retracted position, as shown in FIG. 6, and an extended operational position at which the shoulders 165 or 175 abut the interior of the welder inlet 148.

After the filter plug 115 has been removed from the outer end of cladding 10 by operation of C-clamp 145, the barrel frame 150 is rotated by barrel drive 151 to properly index the reflector loader 160 in a coaxial position aligned with the welder inlet 148. The loader 160 is then shifted along its axis to bring shoulder 165 into engagement with the interior of inlet 148. At this time, the extension 166 will protrude to the open end of cladding 10, previously positioned within the welder 31. Extension 166 locates reflector 162 inwardly from the open end of the cladding, leaving clearance between the reflector and the subsequently added end cap 172. Reflector 162 is then injected into the cladding 10 by operation of cylinder 168 and plunger 167.

After retraction of plunger 167, the reflector loader 160 is reciprocated clear of the welder inlet 148, and barrel frame 150 is again indexed by operation of barrel drive 151. The end cap loader 170, which had previously received an end cap 172, is subsequently aligned with the welder inlet 148. It is also reciprocated along its axis by the associated lead screw 154, bringing shoulder 175 into abutment with the interior of welder inlet 148. At this point, the projecting end cap 172 will be partially inserted within the interior of the cladding 10, with both the end cap 172 and cladding 10 properly positioned for operation of welder 31. As welder 31 is operated, the cladding 10 will be rotated about its longitudinal axis by operation of transport 37. End cap 172 will freely rotate in unison with it, allowing a complete circumferential weld to be formed about cladding 10 and end cap 172. When the welding sequence is finished, the collet fingers 176 within the end cap loader guide 174 are selectively released, permitting loader 170 to be retracted. The completed fuel pin assembly is now withdrawn from welder 31 by operation of transport 37. It can be discharged into fuel pin storage 35 for cleaning and subsequent inspection.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

We claim:

1. In an apparatus for automated loading of fuel assemblies for nuclear reactors, a tungsten arc welder comprising:

a sealable interior enclosure having an opening at one side for axial reception of an open end of a length of cladding;

coaxial collet means in said enclosure for gripping each length of cladding adjacent the open end thereof;

means on said enclosure rotatably journalling the collet means for motion about its central collet axis;

a movable electrode support mounted in said enclosure to one side of the collet axis for selectively positioning an electrode tip along an electrode axis perpendicular to and intersecting the collet axis;

and electrode tip machining means mounted in said enclosure to the remaining side of the collet axis for selectively refurbishing the electrode tip after use in welding the open end of a length of cladding.

2. The apparatus of claim 1 further comprising:

a cylindrical inflatable seal mounted to said enclosure outward from said collet means and coaxial to said collet axis.

3. The apparatus of claim 1 wherein the electrode tip machining means is movable relative to said enclosure along said electrode axis.

4. The apparatus of claim 1 wherein the electrode tip machining means and the electrode support are mounted to said enclosure for movement along the electrode axis independently of one another.

5. The apparatus of claim 1 wherein the electrode tip machining means comprises a rotatable axial grinder coaxially positioned along the electrode axis.

6. The apparatus of claim 1 further comprising:

end cap loader means coaxially positioned along said collet axis for rotatably supporting an end cap within the enclosure and inserted within the open end of a length of cladding.

7. The apparatus of claim 6 wherein both the cladding and end cap are freely supported for rotation about the collet axis.

* * * * *